United States Patent
Nakashima

(10) Patent No.: US 11,108,922 B2
(45) Date of Patent: Aug. 31, 2021

(54) IMAGE PROCESSING APPARATUS, SYSTEM, SERVER, CONTROL METHOD, AND STORAGE MEDIUM TO PERFORM ENCRYPTION PROCESSES ON IMAGE DATA AND ATTRIBUTE DATA USING FIRST AND SECOND KEYS AND FURTHER PERFORM CHARACTER RECOGNITION PROCESS

(71) Applicant: CANON KABUSHIKI KAISHA, Tokyo (JP)

(72) Inventor: Kosuke Nakashima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/918,208

(22) Filed: Jul. 1, 2020

(65) Prior Publication Data

US 2021/0014366 A1 Jan. 14, 2021

(30) Foreign Application Priority Data

Jul. 9, 2019 (JP) .............................. JP2019-127354

(51) Int. Cl.
| | |
|---|---|
| G06F 21/62 | (2013.01) |
| H04N 1/00 | (2006.01) |
| G06F 21/31 | (2013.01) |
| H04N 1/32 | (2006.01) |
| H04N 1/44 | (2006.01) |

(52) U.S. Cl.
CPC ......... *H04N 1/00244* (2013.01); *G06F 21/31* (2013.01); *G06F 21/6227* (2013.01); *H04N 1/32122* (2013.01); *G06F 2221/2141* (2013.01); *H04N 1/4486* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,482,746 B2 | 7/2013 | Nakashima | |
| 8,509,425 B2* | 8/2013 | Inami | H04N 1/444 |
| | | | 380/28 |
| 2003/0002068 A1* | 1/2003 | Constantin | H04N 1/32101 |
| | | | 358/1.15 |
| 2005/0195446 A1* | 9/2005 | Kasatani | H04N 1/00222 |
| | | | 358/402 |
| 2009/0284785 A1* | 11/2009 | Bando | G06F 3/1288 |
| | | | 358/1.15 |
| 2011/0019821 A1* | 1/2011 | Kino | H04N 1/00411 |
| | | | 380/255 |
| 2013/0208310 A1 | 8/2013 | Nakashima | |

(Continued)

FOREIGN PATENT DOCUMENTS

| | | |
|---|---|---|
| JP | 4682837 B2 | 5/2011 |
| JP | 2019020794 A | 2/2019 |

*Primary Examiner* — Haris Sabah
(74) *Attorney, Agent, or Firm* — Carter, DeLuca & Farrell LLP

(57) ABSTRACT

The present invention enables job log records concerning an image processing apparatus to be managed in such a manner that the job log records can be searched on a server such as a cloud server using attributes and a character string included in an image as the job log records remain encrypted, thereby solving a problem concerning privacy.

8 Claims, 15 Drawing Sheets

(56) References Cited

U.S. PATENT DOCUMENTS

| | | | |
|---|---|---|---|
| 2015/0082036 A1* | 3/2015 | Takeda | H04L 9/0894 |
| | | | 713/168 |
| 2015/0104012 A1* | 4/2015 | Holman | H04W 12/02 |
| | | | 380/243 |
| 2018/0076952 A1* | 3/2018 | Kono | G06F 3/1285 |

* cited by examiner

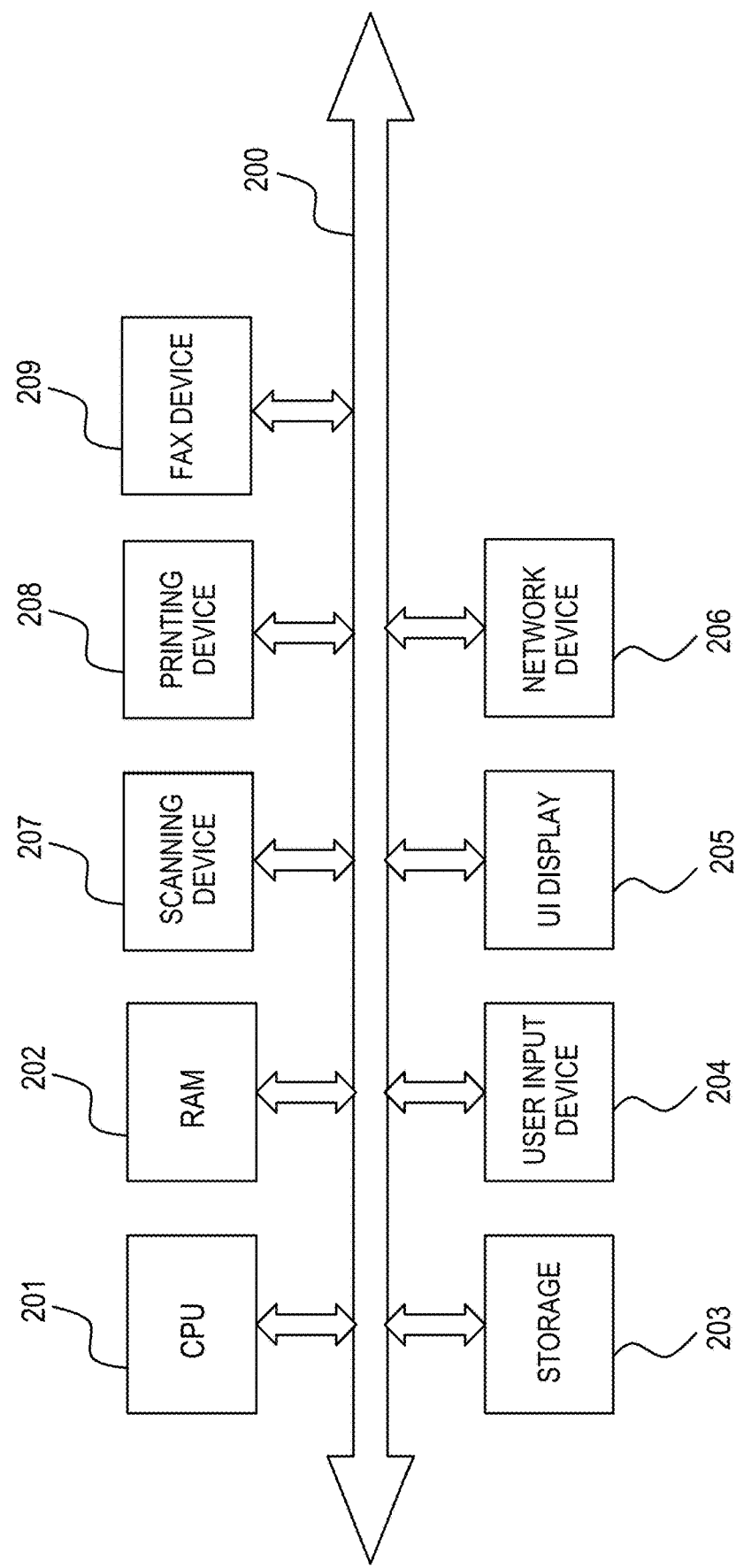

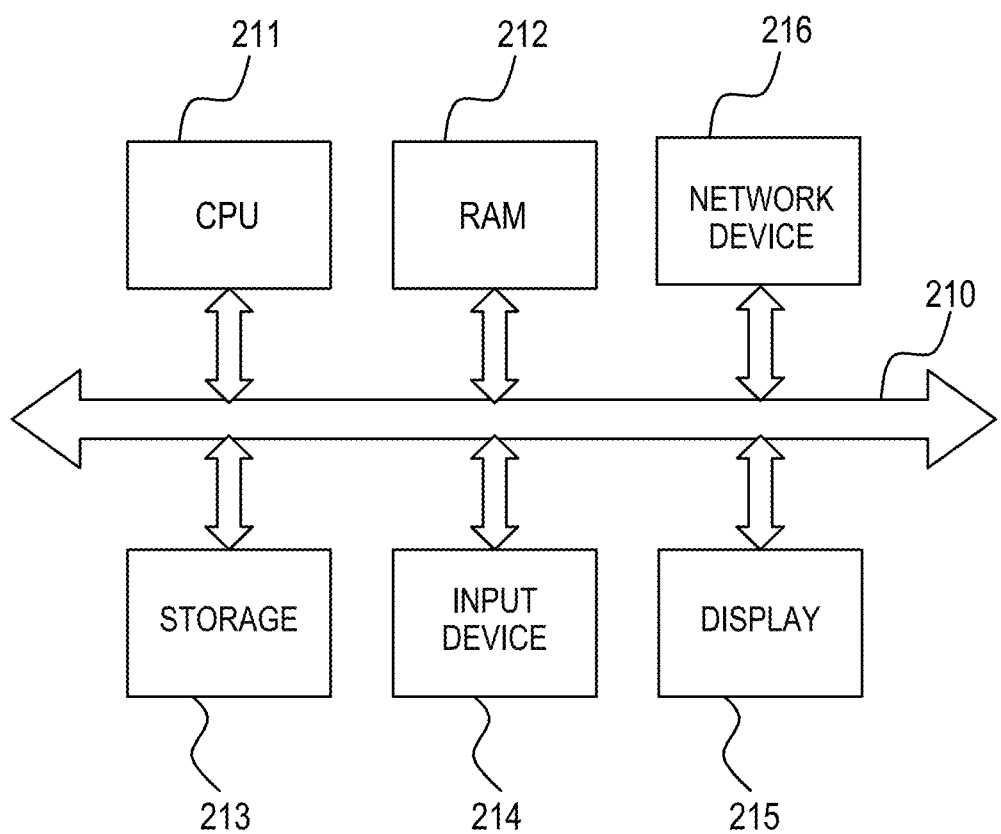

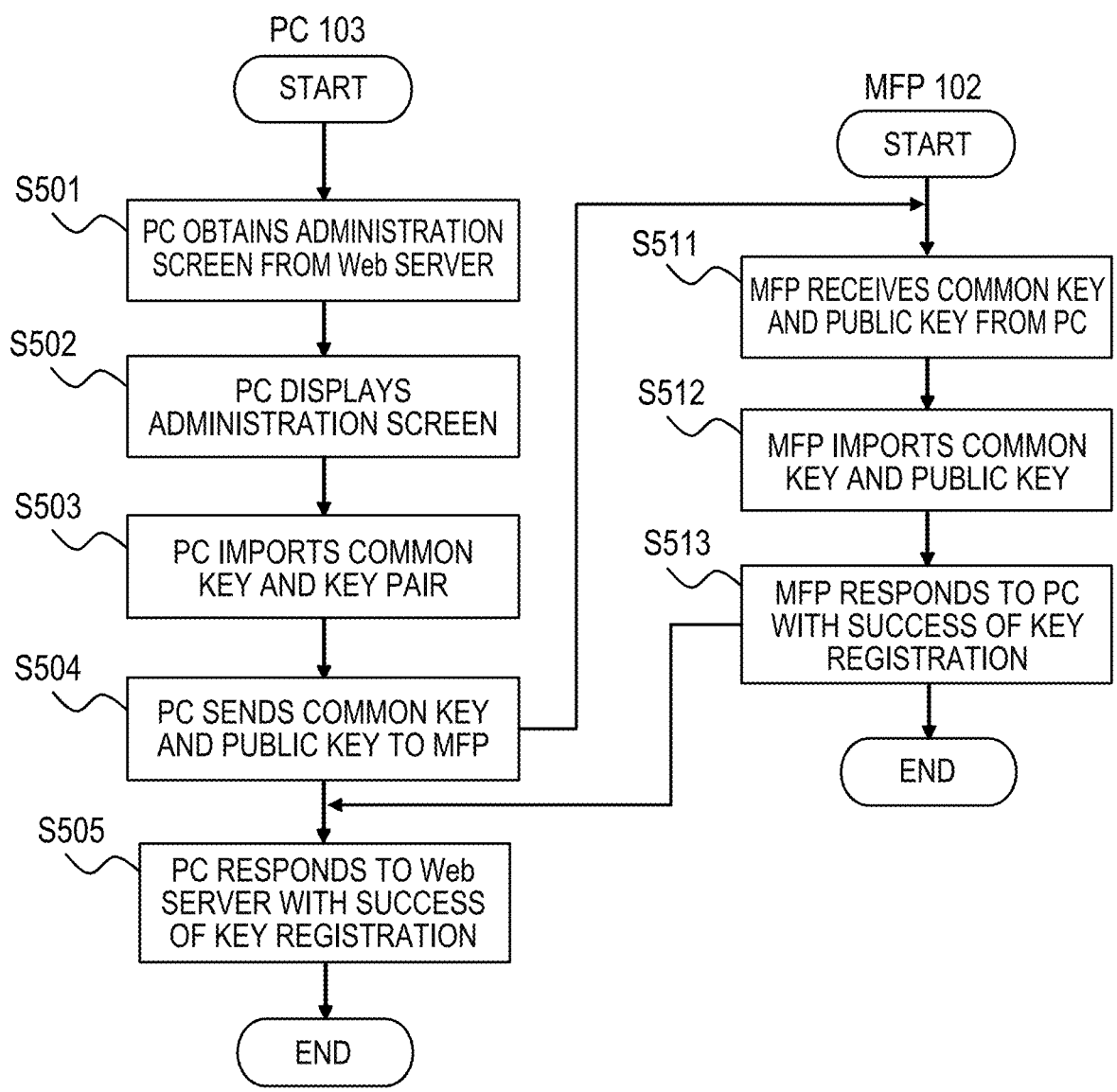

FIG. 6A

```
var commonKeyData;
var keyPairData;

function readKeyData() {

// Select key files
  var files = document.querySelector('input[type=file]');

// Read key data from files
  var commonKeyReader = new FileReader();
  commonKeyReader.addEventListener("load", function () {
    commonKeyData = this.result;
  }, false);
  commonKeyReader.readAsDataURL(files[0]);

var keyPairReader = new FileReader();
  keyPairReader.addEventListener("load", function () {
    keyPairData = this.result;
  }, false);
  keyPairReader.readAsDataURL(files[0]);

```
function storeKeyData(commonKeyData, keyPairData) {

// Open DB for storing key data
  var db;
  var request = indexedDB.open("KeyStore");
  request.onsuccess = function(event) {
    db = event.target.result;
  }

// Add key data to DB
  var keys;
  keys.commonKey = commonKeyData;
  keys.keyPair = keyPairData;
  var transaction = db.transaction(["keyData"],"readwrite");
  var request = objectStore.add(keys);

// Close DB
  db.close();
}
```

FIG. 6C

```
function transferKeyData(address, credential, commonKey, publicKey) { var xhr = new XMLHttpRequest();
  var url = 'https://' + address + '/importKeys';

xhr.open("POST", url, true);
  xhr.setRequestHeader("WWW-Authenticate", credential);
  xhr.onreadystatechange = returnResult();

var keys;
  keys.commonKey = commnoKey;
  keys.publicKey = publicKey;
  xhr.send(keys);
}
```

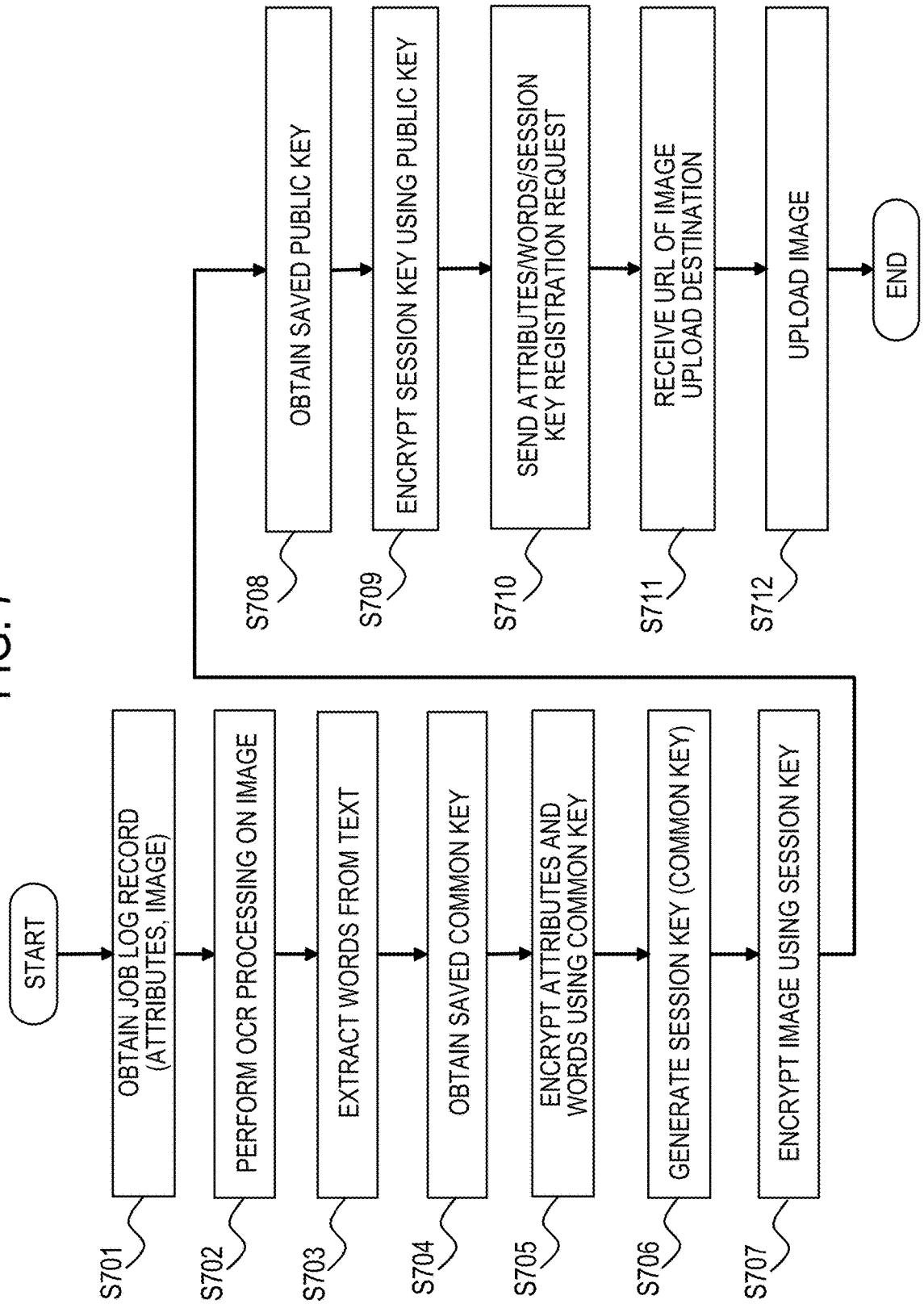

FIG. 8A

```
POST /registerJobLog HTTP/1.1
Host: company123.audit
Authorization: OAuth xxxxxxxx {"attributes": {"deviceId":"ABC001","jobname":"weeklyreport.doc",
 "username":"user1","jobtype":"print","time":"2018-11-19T18:46"},
 "words": ["this","week","product","release","total","6540", ...],
 "sessionkey":"********"}
```

FIG. 8B

```
HTTP/1.1 200 OK
Content-Length: 56

{"url":"/uploadImage/0001.pdf", accessKey:"yyyyyyyy"}
```

FIG. 8C

```
HTTP POST /uploadImage/0001.pdf
Host: company123.audit
X-Accesskey: yyyyyyy

%PDF-1.7
......
......
......
%%EOF
```

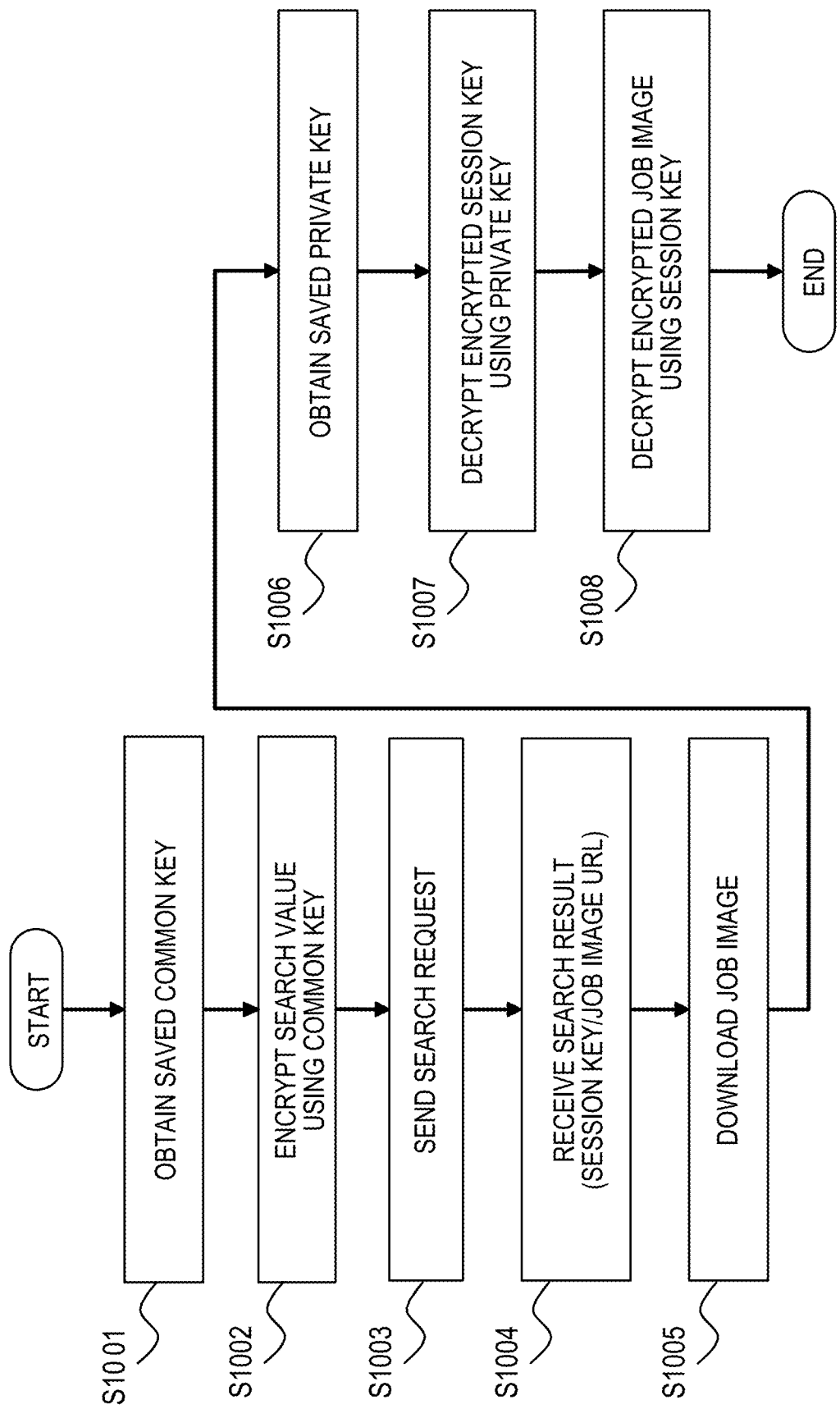

FIG. 11A

```
POST /queryJobLog HTTP/1.1
Host: company123.audit
Authorization: OAuth xxxxxxxx {"username":"user1","jobtype":"scanfax","contents":"release"}
```

FIG. 11B

```
HTTP/1.1 200 OK
Content-Length: 34

{"images":[
{"jobId":"1","url":"/0001.pdf",accesskey:"yyyyyyy","sessionkey":"**********"},
{"jobId":"4","url":"/0004.pdf",accesskey:"zzzzzzz","sessionkey":"**********"}
]}
```

FIG. 11C

```
HTTP GET /downloadImage/0004.pdf
Host: company123.audit
X-AccessKey: zzzzzzz
```

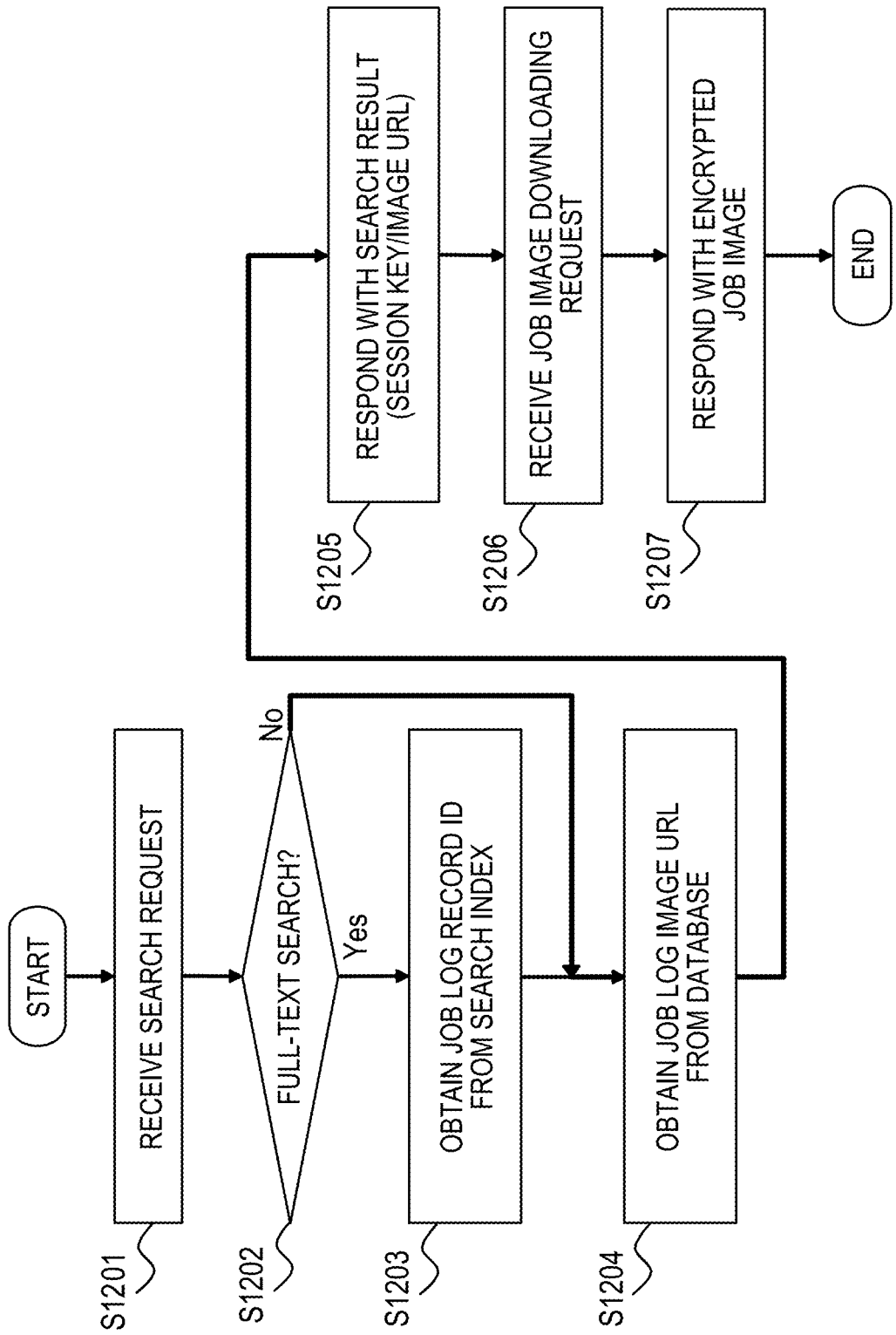

IMAGE PROCESSING APPARATUS, SYSTEM, SERVER, CONTROL METHOD, AND STORAGE MEDIUM TO PERFORM ENCRYPTION PROCESSES ON IMAGE DATA AND ATTRIBUTE DATA USING FIRST AND SECOND KEYS AND FURTHER PERFORM CHARACTER RECOGNITION PROCESS

BACKGROUND OF THE INVENTION

Field of the Invention

The present invention relates to an image processing apparatus, a system, a server, a control method, and a storage medium.

Description of the Related Art

Some image processing apparatuses including a scanner and a printer, such as multi-function peripherals (MFP), have a document tracking function, for the sake of prevention and tracking of the leakage of classified information from paper documents.

Japanese Patent No. 4682837 proposes a technique that causes, when an MFP performs a job such as printing, copying, and sending and receiving a fax, the MFP to write a performance log record of the job containing image data (hereinafter, referred to as a "job log record") and to transfer the job log record to an external server and that allows an administrator to search job log records saved in the external server to refer to content of jobs performed in the past by users.

Japanese Patent Application Laid-Open No. 2019-20794 proposes a technique that enables full-text search through text produced by performing OCR processing on job log records.

At the same time, there has been a growing trend to manage enterprise data using cloud computing services, and there is an increasing need for using cloud computing services to manage job log records that are managed using servers in conventional practice. In the management of customer's classified information on the cloud, most important problems are security and privacy. On the cloud, from the viewpoint of security, data is generally encrypted before saved.

When data is searched in the conventional cloud computing services described above, data is decrypted on the cloud using a key saved on the cloud. However, decrypting customer's classified information on the cloud arises a problem from the viewpoint of privacy. As for Japanese Patent Application Laid-Open No. 2019-20794 described above, there is an idea of enhancing confidentiality by controlling access rights to a full-text search index that includes concealed information, but character strings added to a full-text search index are not encrypted in the first place, and thus Japanese Patent Application Laid-Open No. 2019-20794 does not solve the above-described problems.

The present invention is made to solve the above-described problems. An objective of the present invention is to provide a system that enables job log records concerning an image processing apparatus that can contain classified information to be managed in such a manner that the job log records can be searched on a server such as a cloud server using attributes and a character string included in an image as the job log records remain encrypted.

SUMMARY OF THE INVENTION

One aspect of the present invention includes: an acceptance unit configured to accept a first key and a second key that are used for encryption processing, from an information processing apparatus; a writing unit configured to write, upon performance of a job, attribute data of the job and image data being a subject of the job as a job log record; a performance unit configured to perform character recognition processing on the image data included in the job log record; an extraction unit configured to extract at least one word from a character string that is recognized as a result of the character recognition processing; a first encryption unit configured to perform encryption processing on the attribute data and the at least one extracted word using the first key; a second encryption unit configured to perform encryption processing on the image data included in the job log record using the second key; a sending unit configured to send the attribute data and the at least one extracted word that are encrypted by the encryption processing using the first key to a server over a network; and an upload unit configured to upload encrypted data that is generated by the encryption processing performed on the image data using the second key to the server over the network, according to an instruction from the server.

According to the present invention, job log records concerning an image processing apparatus that can contain classified information can be managed in such a manner that the job log records can be searched with attributes and a character string included in an image on a server such as a cloud server as the job log records remain encrypted. This can therefore establish compatibility between enhanced security brought by encryption and high convenience such as searching using attributes of a job log record and a character string in an image even in a case where job log records of the image processing apparatus are managed on the cloud. As a result, problems about privacy that arise in a case where classified information is saved and managed on the cloud can be solved.

Further features of the present invention will become apparent from the following description of exemplary embodiments with reference to the attached drawings.

BRIEF DESCRIPTION OF THE DRAWINGS

FIG. 2A is a hardware configuration diagram of an WT.

FIG. 2B is a hardware configuration diagram of an information processing apparatus that can be configured as one of a PC and a Web server.

FIG. 5 is a flowchart illustrating an example of processing to import key data.

FIGS. 6A, 6B and 6C are diagrams illustrating an example of JavaScript® codes for importing keys.

FIG. 7 is a flowchart illustrating an example of processing performed by an MFP for sending a job log record to a Web server.

FIGS. 8A, 8B and 8C are diagrams illustrating HTTP messages exchanged when an encrypted job log record is registered.

FIG. 10 is a flowchart illustrating an example of processing performed by a PC for performing a full-text search on job log records on a Web server as the job log records remain encrypted.

FIGS. 11A, 11B and 11C are diagrams illustrating an example of HTTP messages exchanged in a job log record search.

FIG. 12 is a flowchart illustrating an example of processing performed by a Web server for performing a full-text search on job log records as the job log records remain encrypted.

DESCRIPTION OF THE EMBODIMENTS

Embodiments for practicing the present invention will be described below with reference to the drawings. The embodiments to be described below are not intended to limit the present invention according to the claims, and all of the combinations of features described in the embodiments are not necessarily indispensable to a solution for the present invention.

First Embodiment

Figure 1:
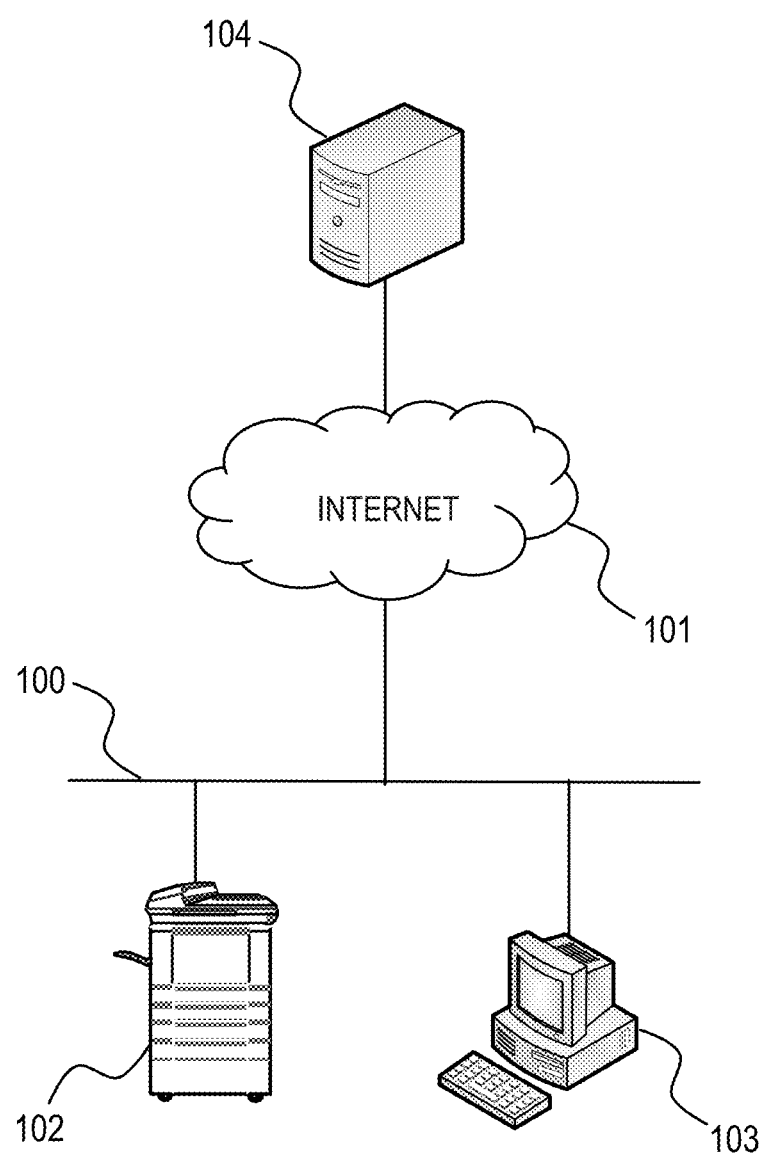
FIG. 1 is a diagram illustrating an example of a configuration of an information processing system that represents an embodiment of the present invention.

FIG. 1 is a diagram illustrating an example of a configuration of an information processing system that represents an embodiment of the present invention.

As illustrated in FIG. 1, the information processing system according to the present embodiment includes an intranet 100, the Internet 101, an MFP 102, a PC 103, a Web server 104, and the like. Note that there may be a plurality of MFPs 102 on the network.

The intranet 100 is a network foundation on which the MFP 102 and the PC 103 communicate with each other. The Internet 101 is a network foundation on which the MFP 102 and the PC 103 communicate with the Web server 104.

The MFP 102 is an image processing apparatus including a scanner and a printer. When performing a job such as printing, copying, and sending and receiving a fax, the MFP 102 writes a performance log record of the job containing image data (job log record). The MFP 102 is connected to the Web server 104 over the Internet 101 to be able to communicate with the Web server 104, and the MFP 102 encrypts the job log record and sends the job log record to the Web server 104. Although the present embodiment is described assuming that the image processing apparatus is a multi-function peripheral (MFP), note that the image processing apparatus may be a single function peripheral (SFP) such as a printer.

The PC 103 is connected to the MFP 102 over the intranet 100 to be able to communicate with the MFP 102, and the PC 103 sends key data used for encrypting a job log record to the MFP 102. The PC 103 is also connected to the Web server 104 over the Internet 101, and the PC 103 sends a job log record search request to the Web server 104 and receives a search result. This allows an administrator or the like to search job log records saved in the Web server 104 to refer to the content of jobs performed in the past by users.

The Web server 104 is a server system that stores and manages encrypted job log records sent from the MFP 102 over the Internet 101. In response to a job log record search request from the PC 103, the Web server 104 searches the job log records remaining encrypted and returns a search result to the PC 103. Note that the Web server 104 may be implemented by one computer and may be implemented by a plurality of computers. For example, the Web server 104 may have a configuration that is implemented by use of a cloud computing service or the like.

FIG. 2A is a diagram illustrating an example of a hardware configuration of the MFP 102.

The MFP 102 includes a CPU 201, a RAM 202 providing a work area for the CPU 201, and a storage 203 (may be an HDD, SSD, NVRAM, etc.) storing a program according to the present embodiment, various kinds of setting information, and the like. In addition, the MFP 102 includes a user input device 204 with which a user inputs a command, a UI display 205 that displays a screen, a network device 206 that performs communication with other apparatuses over the network, and a main bus 200.

In the present embodiment, in the MFP 102, the CPU 201 controls the RAM 202, the storage 203, the user input device 204, the UI display 205, and the network device 206 via the main bus 200, unless otherwise noted.

The MFP 102 additionally includes a scanning device 207, a printing device 208, and a fax device 209 that are connected to the main bus 200.

The UI display 205 may also serve as the user input device 204 as a touch panel display.

FIG. 2B is a diagram illustrating an example of a hardware configuration of an information processing apparatus that can be configured as one of the PC 103 and the Web server 104.

The information processing apparatus that can be configured as one of the PC 103 and the Web server 104 includes a CPU 211 and a RAM 212 providing a work area for the CPU 211. In addition, the information processing apparatus includes a storage 213 (may be an HDD, SSD, NVRAM, etc.) storing programs relating to flowcharts described below, other pieces of software, and various kinds of setting information.

In addition, the information processing apparatus includes an input device 214 with which a user inputs a command, a display 215 that displays a screen, a network device 216 that performs communication with other apparatuses over the network, and a main bus 210.

In the present embodiment, in the Web server 104 and the PC 103, the CPU 211 controls the rest of the illustrated configuration via the main bus 210, unless otherwise noted.

The display 215 may also serve as the input device 214 as a touch panel display.

The Web server 104 need not include the input device 214 and the display 215.

Figure 3:
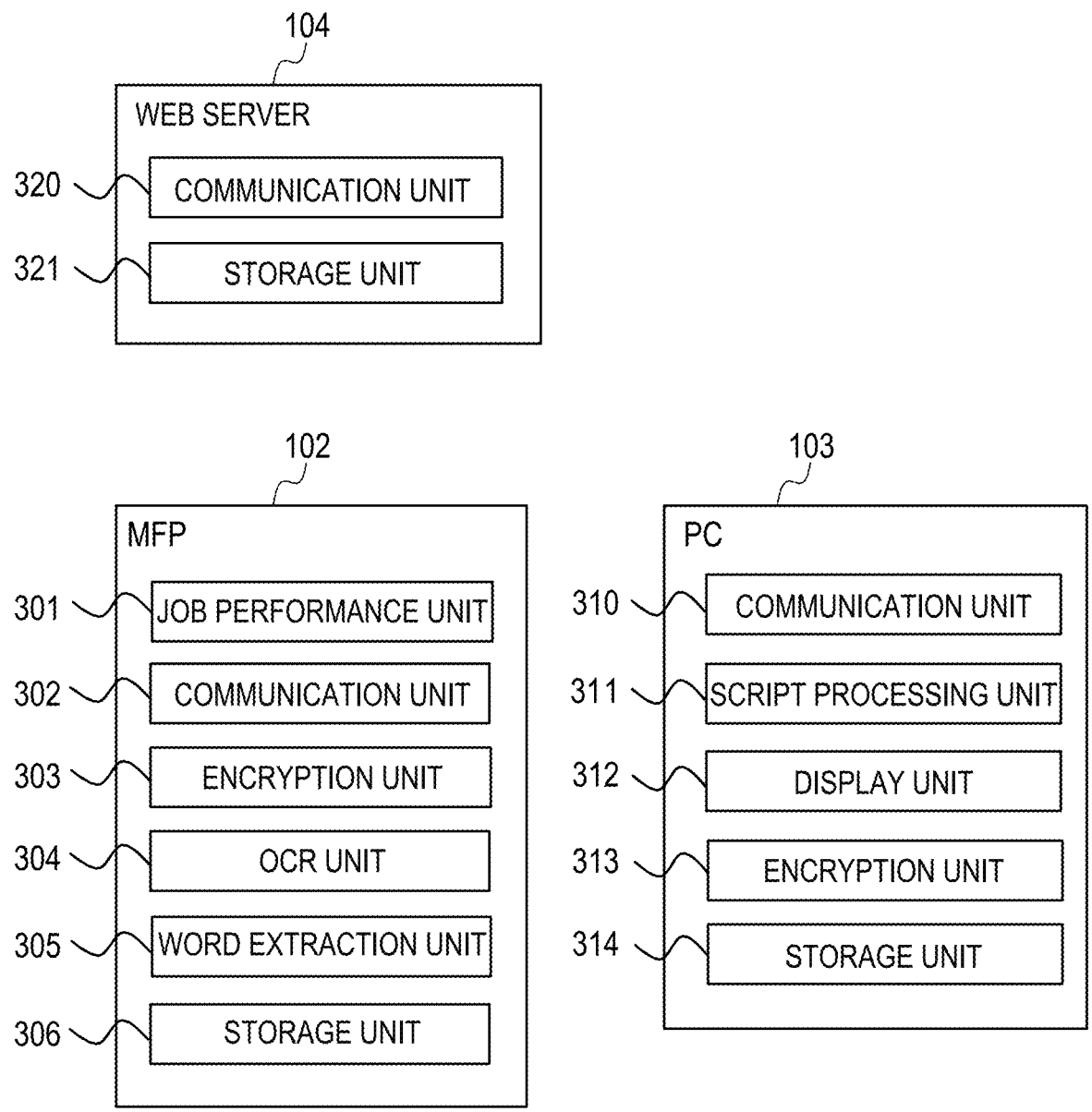
FIG. 3 is a software configuration diagram of the information processing system according to the present embodiment.

FIG. 3 is a diagram illustrating an example of a software configuration of the MFP 102, the PC 103, and the Web server 104. Note that functional units illustrated in FIG. 3 are implemented by the CPU included in one of the MFP 102, the PC 103, and the Web server 104 loading a control program stored in the storage onto the RAM and executing the control program.

As functional units implemented by software, the MFP 102 includes a job performance unit 301, a communication unit 302, an encryption unit 303, an OCR unit 304, a word extraction unit 305, and a storage unit 306.

As functional units implemented by software, the PC 103 includes a communication unit 310, a script processing unit 311, a display unit 312, an encryption unit 313, and a storage unit 314.

As functional units implemented by software, the Web server 104 includes a communication unit 320 and a storage unit 321.

First, the software configuration of the MFP 102 will be described.

The job performance unit 301 has functions of performing jobs for processing copying, printing, sending a fax, receiving a fax, and sending scan data by controlling the scanning device 207, the printing device 208, the fax device 209, and the network device 206. In addition, the job performance unit 301 stores job attributes associated with a job (attribute data on the job) and a job image (image data being an object in the job) in the storage unit 306 as a job log record.

Table 1 illustrates an example of a job log record stored in the storage unit 306.

TABLE 1

| APPARATUS ID | JOB NAME | USER NAME | DATE TIME | JOB TYPE | JOB IMAGE |
|---|---|---|---|---|---|
| ABC001 | WeeklyReport.doc | user1 | 2018 Nov. 19 18:46 | Print | ****** |

A job log record includes job attributes and a job image. The job attributes include an apparatus ID, a job name, a user name, a date and time, a job type, and the like. The job log record illustrated in Table 1 represents a print job named "WeeklyReport.doc" performed by a user "user1" using an apparatus "ABC001" at Nov. 19, 2018 18:46.

The communication unit 302 has a function of communicating with one of the Web server 104 and the PC 103 according to the hypertext transfer protocol (HTTP). The communication unit 302 receives, from the PC 103, key data used for encrypting a job log record and sends, to the Web server 104, the encrypted job log record. The communication unit 302 encrypts its communication channel using the transport layer security (TLS).

The encryption unit 303 has a function of encrypting a job log record stored in the storage unit 306. The encryption unit 303 encrypts job attributes according to the format preserving encryption (FPE) and encrypts a job image using a common key and a public key in combination. FPE is a kind of common key encryption, and FPE-encrypted values are unique to each other, allowing data to be searched for as the data remain encrypted. Encryption processing performed by the MFP 102 will be described below in detail with reference to FIG. 7.

The OCR unit 304 has a function of performing optical character recognition (OCR) on a job image (i.e., performing character recognition processing on image data included in a job log record). The OCR unit 304 recognizes characters included in the job image to convert the characters into text (character strings).

The word extraction unit 305 has a function of analyzing text to extract words. Generally known examples of text analysis performed by the word extraction unit 305 include one for European and American languages that extracts words while excluding delimiters called Stop Words and lowercases the words, and one called morphological analysis for Japanese that uses dictionary data as a basis to extract words found in the dictionary data.

The storage unit 306 saves a job log record and key data in the storage 203. In a case where the CPU 201 is equipped with a trusted platform module (TPM), the storage unit 306 may encrypt the key data using the TPM before saving the key data. The storage unit 306 saves the Stop Words and the dictionary data used by the word extraction unit 305 for the text analysis, in the storage 203.

Next, the software configuration of the PC 103 will be described.

The communication unit 310 has a function of communicating with one of the MFP 102 and the Web server 104 according to the HTTP. The communication unit 310 receives content including an operation screen from the Web server 104. The communication unit 310 sends key data to encrypt a job log record to the MFP 102. Moreover, the communication unit 310 sends a job log record search request to the Web server and receives a job log record as a search result. The communication unit 310 encrypts its communication channel using the TLS.

The script processing unit 311 analyzes JavaScript® codes included in content received by the communication unit 310 to control the import of key data, the encryption of a search value, and the decryption of a job log record.

The display unit 312 has a function of analyzing HTML and CSS included in content received from the Web server 104 to display an operation screen on the UI display 205. HTML refers to HyperText Markup Language. CSS refers to Cascading Style Sheets. Moreover, the display unit 312 has a function of accepting an input operation from the user input device 204. Administration screens displayed by the display unit 312 include a screen used for importing key data to the PC 103 and the MFP 102 and a screen used for searching a job log record stored in the Web server 104 to see a job image. The administration screens displayed by the PC 103 will be described below with reference to FIG. 4.

The encryption unit 313 has a function of encrypting a job log record search request and decrypting a job log record. More specifically, when searching a job log record, the encryption unit 313 encrypts a job attribute value used for the search according to the FPE. Moreover, the encryption unit 313 decrypts a job image of a job log record using a public-key cryptosystem and a common-key cryptosystem in combination. Key data used in the encryption is stored beforehand in the storage unit 314. Encryption processing performed by the PC 103 will be described below in detail with reference to FIG. 10.

The storage unit 314 has a function of saving key data used in the encryption of a job log record in the storage 203. More specifically, the storage unit 314 has a function of saving a common key used in the encryption of a job attribute and a key pair (a public key and a private key) used in decryption of a job image, in the storage 203.

Next, the software configuration of the Web server 104 will be described.

The communication unit 320 has a function of communicating with one of the MFP 102 and the PC 103 according to the HTTP. The communication unit 320 receives a job log record sent from the MFP 102. The communication unit 320 receives a search request sent from the PC 103 and responds to the PC 103 with a job log record. The communication unit 320 encrypts its communication channel using the TLS.

The storage unit 321 has a function of saving a job log record received from the MFP 102 in the storage 203. The storage unit 321 stores job attributes in a database, words in a full-text search index, and job images in a file system.

Table 2 schematically illustrates the database storing job log records.

TABLE 2

| JOB LOG RECORD ID | APPARATUS ID | JOB NAME | USER NAME | DATE TIME | JOB TYPE | IMAGE FILE PATH | SESSION KEY |
|---|---|---|---|---|---|---|---|
| 1 | ABC001 | WeeklyReport.doc | user1 | 2018 Nov. 19 18:46 | Print | 0001.pdf | ******** |
| 2 | ABC002 | DevelopmentPlan.ppt | user2 | 2018 Nov. 20 09:31 | Print | 0002.pdf | ******** |
| 3 | ABC001 | | user3 | 2018 Nov. 20 10:12 | Copy | 0003.pdf | ******** |
| 4 | ABC001 | NovemberStatement | user1 | 2019 Nov. 24 15:40 | ScanFax | 0004.pdf | ******** |

Each row of the database includes a job log record ID, an apparatus ID, a job name, a user name, a date and time, a job type, an image file path, and a session key.

The job log record ID is an ID generated by the storage unit 321 to identify a job log record uniquely. The job log record ID is not encrypted.

The apparatus ID, the job name, the user name, the date and time, and the job type are job attributes sent from the MFP 102. The image file path is a file path, in the file system, of a job image encrypted by the MFP 102. The session key is a common key used in the encryption of a job image by the MFP 102. Table 2 is illustrated in plain text for ease of illustration, but at least the job attributes and the session key are pieces of information that are already encrypted by the MFP 102. Apparatus information, user information, and information about the job generated by the MFP 102 are all encrypted by the MFP 102 as necessary. The Web server 104 does not decrypt the encrypted information, issues an ID with the information remaining undecrypted, and associates the ID with the encrypted information to manage the information.

Table 3 schematically illustrates the full-text search index storing words extracted from job images.

TABLE 3

| WORD | JOB LOG RECORD ID |
|---|---|
| this | 1, 3 |
| week | 1, 2 |
| product | 1, 3, 4 |
| release | 1, 4 |
| total | 1, 2, 3 |
| 6540 | 1 |

The full-text search index includes words and job log record IDs. As illustrated in Table 3, a job log record including a word can be identified by using the full-text search index. Each word added to the full-text search index is already encrypted by the MFP 102.

Table 2 and Table 3 illustrate the attributes and the words in plain text for ease of illustration, but the attributes and the words are actually encrypted. In addition, the job images are already encrypted by the MFP 102 as with the job attributes. As seen from the above, the pieces of information sent from the MFP 102 are all encrypted. Encryption processing performed by the MFP 102 will be described below in detail with reference to FIG. 7.

Next, administration screens displayed on the display 215 by the PC 103 will be described with reference to a screen transition diagram illustrated in FIG. 4.

Figure 4:
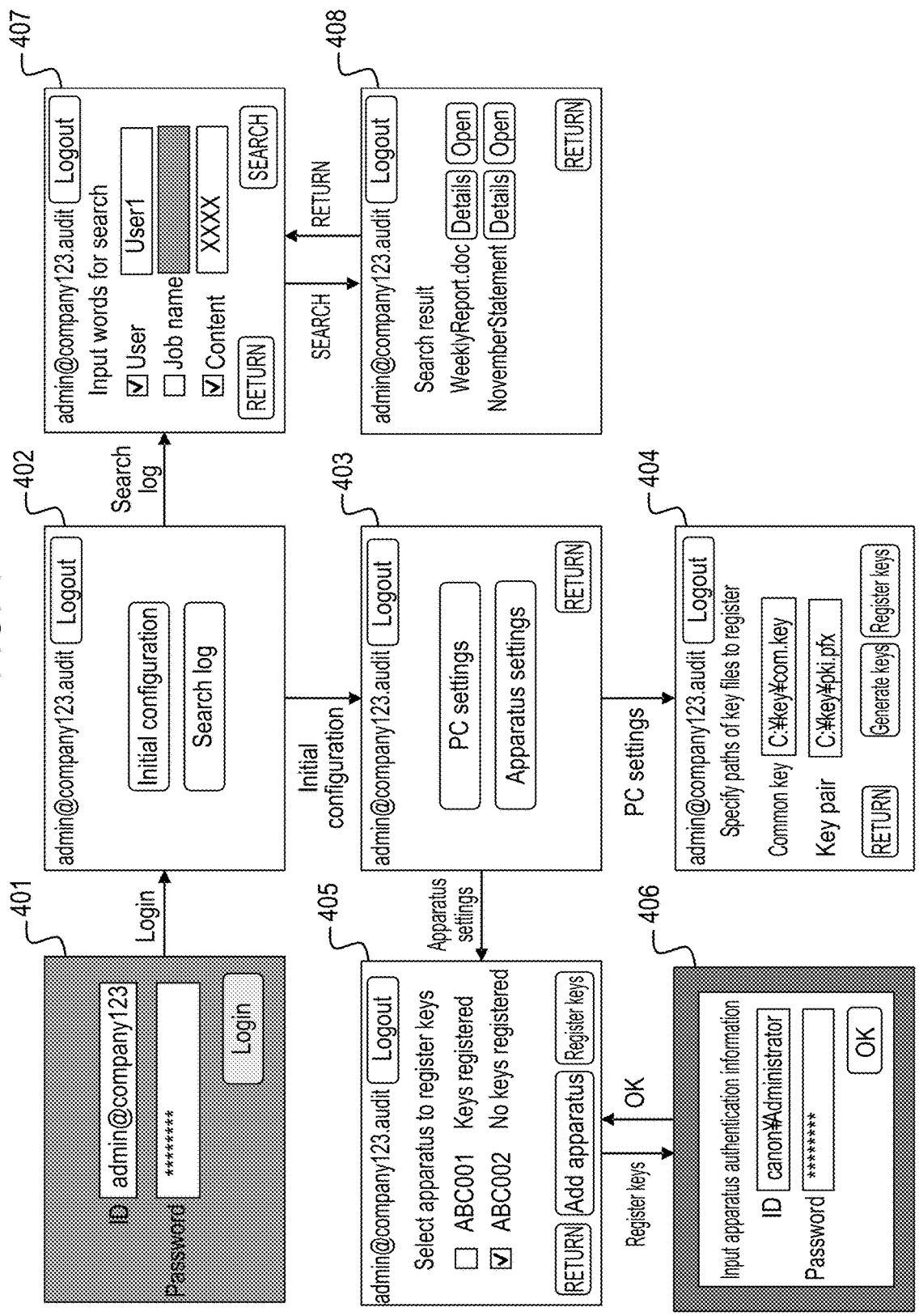
FIG. 4 is a diagram used for describing transition between administration screens displayed by a PC.

FIG. 4 is the diagram used for describing transition between the administration screens displayed by the PC 103.

First, a login screen 401 is a screen on which an ID and a password are input to perform a login to the Web server 104. The login screen 401 is displayed when the PC 103 accesses the Web server 104. When the login succeeds on the login screen 401, the display unit 312 makes a screen transition to a main menu screen 402.

The main menu screen 402 is used for starting initial configuration and for starting a log search. The main menu screen 402 includes an initial configuration button and a log search button. Pressing the initial configuration button causes the display unit 312 to make a screen transition to an initial configuration screen 403. Pressing the log search button causes the display unit 312 to make a screen transition to a log search screen 407.

The initial configuration screen 403 is a screen used for performing initial configuration on the PC 103 and the MFP 102. The initial configuration screen 403 includes a PC setting button and an apparatus setting button. Pressing the PC setting button causes the display unit 312 to make a screen transition to a PC setting screen 404. Pressing the apparatus setting button causes the display unit 312 to make a screen transition to an MFP setting screen 405.

The PC setting screen 404 is a screen used for importing key data for encrypting a job log record into the PC 103. The PC setting screen 404 includes a common key file input field, a key pair file input field, and a key registration button. The common key input field is used for specifying a file path of a common key used for encrypting job attributes. The key pair input field is used for specifying a file path of a key pair (a public key and a private key) used for encrypting a job image. Pressing the key registration button causes the storage unit 314 to store the specified key data. In addition to the UI for importing the key files prepared beforehand by a user, the PC setting screen may provide a UI with which keys are generated by the PC and stored in the storage unit 314.

The MFP setting screen 405 is a screen used for importing key data used for encrypting a job log record into the MFP 102. The MFP setting screen 405 includes a list of MFPs to administrate and a key registration button. Pressing the key registration button causes the display unit 312 to make a screen transition to an apparatus authentication screen 406 used for importing key data into an MFP 102 specified on the list of MFPs to administrate. Here, the key data to be imported into the MFP 102 is the key data imported into the PC 103 on the PC setting screen 404 beforehand.

The apparatus authentication screen 406 is a screen on which an ID and a password are input to request authentication on the MFP 102. When the authentication succeeds, the key data exported from the PC 103 is imported into the MFP 102.

The log search screen 407 is a screen used for searching for a job log record stored in the Web server 104. The log search screen 407 includes a search value input field and a search button. Pressing the search button causes the PC 103 to perform search processing to check whether a job log record having a job attribute value that matches a search value is present in the Web server 104 (hereinafter, referred to as "job attribute search"). The PC 103 also performs search processing to check whether a job log record with a job image including text that contains a search value is present in the Web server 104 (hereinafter, referred to as "job full-text search"). When the searching processing on the Web server 104 is completed, the display unit 312 makes a screen transition to a search result screen 408.

The search result screen 408 is a screen used for checking a searched job log record. The searching result screen includes a job log record list and an open button. The job log record list is a list of a piece of searched job log record information. Pressing the open button causes the display unit 312 to display a log image of a job log record specified in the job log record list (not illustrated).

A flow of processing by the PC 103 and the MFP 102 to import key data will be described below with reference to FIG. 5.

FIG. 5 is a flowchart illustrating an example of processing by the PC 103 and the MFP 102 to import key data. Processes illustrated as S501 to S505 are to be performed by the PC 103 and are implemented by the CPU 211 of the PC 103 loading a control program stored in the storage 213 of the PC 103 or the like onto the RAM 212 of the PC 103 and executing the control program. Processes illustrated as S511 to S513 are to be performed by the MFP 102 and are implemented by the CPU 201 loading a control program stored in the storage 203 or the like onto the RAM 202 and executing the control program.

Upon acceptance of an instruction to display the administration screen by the display unit 312 of the PC 103, a process of S501 is started.

In S501, the communication unit 310 of the PC 103 sends an HTTP request to obtain the administration screen to the Web server 104 and receives an HTTP response that includes the administration screen as its content from the Web server 104.

Next, in S502, the display unit 312 of the PC 103 interprets the content obtained in S501 to display the administration screen on the UI display 205. The display unit 312 of the PC 103 then displays the PC setting screen 404 as a result of accepting operation instructions from the user input device 204 according to the transition between the administration screens described above.

Next, in S503, the script processing unit 311 of the PC 103 interprets a JavaScript code included in the content and stores the specified common key and key pair in the storage unit 314.

FIGS. 6A and 6B are diagrams illustrating an example of JavaScript codes for importing keys.

FIG. 6A illustrates an example of a JavaScript code for reading items of key data from the specified file paths. FIG. 6B illustrates an example of a JavaScript code for registering the specified key data items in a database of the storage unit 314.

Next, in S504, the script processing unit 311 of the PC 103 interprets a JavaScript code included in the content and sends the common key and the public key to an address (an IP address or a hostname) of the specified MFP. Of the key data items included in the key pair, only the public key is used for encrypting a job image, and thus the private key is not sent.

FIG. 6C illustrates an example of a JavaScript code for sending an HTTP request including common key data and public key data to an address of the specified MFP 102 with prescribed authentication information set to the HTTP request.

In S511, upon receiving the HTTP request including the common key data and the public key data from the PC 103, the communication unit 302 of the MFP 102 proceeds the processing to S512.

In S512, the storage unit 306 of the MFP 102 saves the common key data and the public key data received in S511 in the storage 203.

Next, in S513, the communication unit 302 of the MFP 102 sends to the PC 103 an HTTP response for responding with the success of importing the key data.

In S505, upon receiving the HTTP response for responding with the success of importing the key data from MFP 102, the communication unit 310 of the PC 103 sends to the Web server 104 an HTTP request for notifying the Web server 104 that the key data has been imported into the MFP 102. Then, upon receiving an HTTP response from the Web server 104, the communication unit 310 of the PC 103 finishes the processing.

As seen from the above, the key data items used for encrypting a job log record are sent from the PC 103 to the MFP 102 via the intranet 100 safely, without via the Internet 101, and then received by the MFP 102. In addition, the key data items are held by one of the PC 103 and the MFP 102 but not held by the Web server 104, allowing a system to be built more safely. In the present embodiment, the key data prepared by a user beforehand is imported into the PC 103 and the MFP 102, but this does not limit embodiments of the present invention. The key data may be generated by the encryption unit 313 of the PC 103, and the generated key data may be imported into the PC 103 and the MFP 102.

Next, a flow of processing by the MFP 102 to send a job log record to the Web server 104 will be described with reference to FIG. 7.

FIG. 7 is a flowchart illustrating an example of processing performed by the MFP 102 for sending a job log record to the Web server 104. The processing illustrated in this flowchart is implemented by the CPU 201 of the MFP 102 loading a control program stored in the storage 203 or the like onto the RAM 202 and executing the control program.

Upon storage of a job log record in the storage unit 306 by the job performance unit 301 of the MFP 102, a process of S701 is started. In S701, the encryption unit 303 of the MFP 102 obtains the job log record stored in the storage unit 306. As illustrated in Table 1, the job log record includes job attributes and a job image. The job attributes include a job name, a user name, a date and time, and a job type.

Next, in S702, the OCR unit 304 of the MFP 102 performs OCR processing on the job image to convert the job image to text.

In S703, the word extraction unit 305 of the MFP 102 analyzes the text obtained in S702 to extract words.

Next, In S704, the encryption unit 303 of the MFP 102 obtains a common key stored in the storage unit 306. The common key is imported from the PC 103 beforehand, as described above.

Next, in S705, the encryption unit 303 of the MFP 102 uses the common key obtained in S704 to perform FPE encryption on the job attribute values obtained in S701 and the words extracted in the above S703.

Next, in S706, the encryption unit 303 of the MFP 102 generates a common key. Hereinafter, this common key will be referred to as a session key. The session key is generated in such a manner that session keys differ between jobs.

Next, in S707, the encryption unit 303 of the MFP 102 uses the session key generated in S705 to encrypt the job image. For all jobs, the job attribute values and the words are encrypted using the same key (the common key imported from the PC 103) because the job attribute values and the words are to be searched. In contrast, job images are encrypted using keys (session keys) that differ between jobs, which reduces a security risk in a case of leakage of a key.

Next, In S708, the encryption unit 303 of the MFP 102 obtains a public key stored in the storage unit 306. The public key is imported from the PC 103 beforehand, as described above.

Next, in S709, the encryption unit 303 of the MFP 102 uses the public key obtained in S708 to encrypt the session key. The decryption of the session key needs a private key, and only the PC 103, which holds the private key, can decrypt the job image. This enhances security.

Next, in S710, the communication unit 302 of the MFP 102 sends an HTTP request for requesting the registration of the encrypted job log record to the Web server 104.

FIGS. 8A to 8C are diagrams illustrating HTTP messages exchanged when an encrypted job log record is registered.

FIG. 8A illustrates an example of the HTTP request sent in S710.

A header of the HTTP request includes URL information about the Web server 104 and information on the authentication with the Web server 104. A body of the HTTP request includes, as job attributes, an apparatus ID, a job name, a user name, a job type, and a date and time, further includes all words extracted, and additionally includes a session key, in the JSON format. FIG. 8A illustrates the attribute values and the words in plain text for ease of illustration, but the attribute values and the words are actually subjected to the FPE encryption as described above.

Next, in S711, the communication unit 302 of the MFP 102 receives an HTTP response including job image upload destination information from the Web server 104.

FIG. 8B illustrates an example of the HTTP response received in S711.

A body of the HTTP response includes the job image upload destination information in the JSON format. The job image upload destination information includes a URL used for uploading the encrypted job image (location information indicating a storage location to which the encrypted job image is to be uploaded) and an access key for the permission of the uploading.

Next, in S712, the communication unit 302 of the MFP 102 sends an HTTP request for uploading the encrypted job image (encrypted data made by encrypting the image data included in the job log record) to the Web server 104.

FIG. 8C illustrates an example of the HTTP request sent in S712.

A header of the HTTP request includes a URL used for uploading the encrypted job image and includes an access key. A body of the HTTP request includes the job image in the form of PDF data. FIG. 8C illustrates the job image in plain text for ease of illustration, but the job image is actually encrypted using a session key as described above.

Then, upon receiving an HTTP response for responding with the completion of the uploading from the Web server 104, the communication unit 302 of the MFP 102 finishes the processing of this flowchart.

As seen from the above, the job attributes, the words, and the job image sent from the MFP 102 to the Web server 104 are all encrypted. The encryption processing on the job attributes and the words and the encryption processing on the job image use encryption keys different from each other. In the present embodiment, the processing of obtaining the job log record is started upon storage of the job log record in the storage unit 306 by the job performance unit 301 of the MFP 102, but this does not limit embodiments of the present invention. The processing of obtaining a job log record may be started regularly according to a preset schedule.

Next, a flow of processing by the Web server 104 to register an encrypted job log record will be described with reference to FIG. 9.

Figure 9:
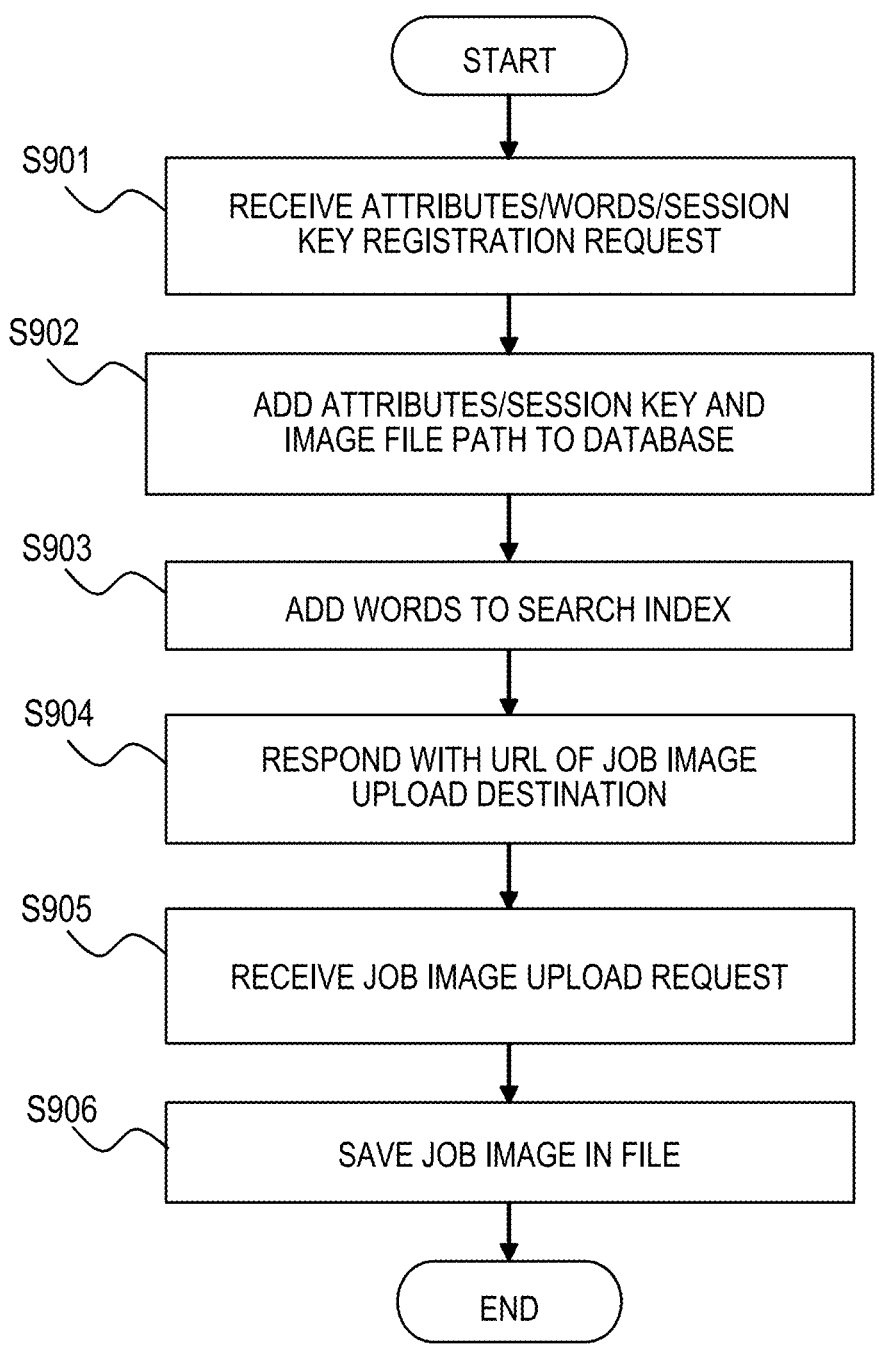
FIG. 9 is a flowchart illustrating an example of processing performed by a Web server for registering an encrypted job log record.

FIG. 9 is a flowchart illustrating an example of processing performed by the Web server 104 for registering an encrypted job log record. The processing illustrated in this flowchart is implemented by the CPU 211 of the Web server 104 loading a control program stored in the storage 213 of the Web server 104 or the like onto the RAM 212 of the Web server 104 and executing the control program.

Upon receiving an encrypted job log record registration request, the Web server 104 starts a process of S901. In S901, the communication unit 320 of the Web server 104 receives an HTTP request for requesting the registration of an encrypted job log record (S710 in FIG. 7, e.g., see FIG. 8A). The communication unit 320 then reads an apparatus ID, a job name, a user name, a job type, a date and time, words, and a session key that are already encrypted and included in a body of the HTTP request in the JSON format.

Next, in S902, the storage unit 321 of the Web server 104 associates the encrypted apparatus ID, job name, user name, job type, date and time, and session key obtained in S901 with a job log record ID and registers the encrypted apparatus ID, job name, user name, job type, date and time, session key and the job log record ID in a database. The job log record ID is generated by the storage unit 321 to identify the job log record uniquely. Furthermore, as an image file path, the storage unit 321 associates a file path on a file system (URL information) used for saving an encrypted job image with the job log record ID and registers the file path and the job log record ID in the database. By this step, a record like one of the records illustrated in Table 2 described above is registered.

Next, in S903, the storage unit 321 of the Web server 104 adds the encrypted words obtained in S901 to the full-text search index illustrated in Table 3.

Next, in S904, the communication unit 320 of the Web server 104 sends an HTTP response including job image upload destination information (e.g., see FIG. 8B) to the MFP 102. The job image upload destination information includes the URL information that is used for uploading the encrypted job image and registered as the image file path in S902 and an access key for the permission of uploading the data to the path indicated by the URL information. At that time, the Web server 104 can temporarily permit the MFP 102 to upload the encrypted job image while restricting access sources using the access key.

In S905, the communication unit 320 of the Web server 104 receives an HTTP request for uploading the encrypted job image (S712 in FIG. 7, e.g., see FIG. 8C).

Next, in S906, the storage unit 321 of the Web server 104 saves the job image included in the HTTP request in a save area indicated by the file path that is registered beforehand in the database as the image file path.

Then, upon sending an HTTP response for responding with the completion of the uploading to the MFP 102, the communication unit 320 of the Web server 104 finishes the processing of this flowchart.

As seen from the above, the job attributes and the job image registered in the database by the Web server 104 are all encrypted and given enhanced security.

Next, a flow of processing by the PC 103 to perform a full-text search on job log records on the Web server 104 as the job log records remain encrypted will be described with reference to FIG. 10.

FIG. 10 is a flowchart illustrating an example of processing performed by the PC 103 for performing a full-text search on job log records on the Web server 104 as the job log records remain encrypted. The processing illustrated in this flowchart is implemented by the CPU 211 of the PC 103 loading a control program stored in the storage 213 of the PC 103 or the like onto the RAM 212 of the PC 103 and executing the control program.

Upon accepting a log search instruction, the script processing unit 311 of the PC 103 starts a process of S1001. In S1001, the script processing unit 311 of the PC 103 interprets a JavaScript code included in content of the administration screen and obtains the common key saved in the storage unit 314.

In S1002, the script processing unit 311 of the PC 103 performs the FPE encryption on a search value using the common key.

Next, in S1003, the communication unit 310 of the PC 103 sends an HTTP request for requesting a job log record search to the Web server 104.

FIGS. 11A to 11C are diagrams illustrating an example of HTTP messages exchanged in a job log record search.

FIG. 11A illustrates an example of the HTTP request sent in S1003.

A header of the HTTP request includes URL information about the Web server 104 and information on the authentication with the Web server 104. A body of the HTTP request includes search values for one of a job attribute search and a job full-text search, in the JSON format. The example illustrated in FIG. 11A expresses that a job log record having a user name of "user1" and a job type is sending a fax and including a job image including a word "release" is to be searched for. FIG. 11A illustrates the search values in plain text for ease of illustration, but the search values are actually subjected to the FPE encryption as described above.

Next, in S1004, the communication unit 310 of the PC 103 receives an HTTP response for responding with a search result from the Web server 104.

FIG. 11B illustrates an example of the HTTP response received in S1004.

A body of the HTTP response includes a URL used for downloading an encrypted job image, an access key for the permission of the downloading, and a session key. Here, the Web server 104 issues the access key to temporarily permit the PC 103 to download the encrypted job image while restricting access sources to the PC 103.

Next, in S1005, the communication unit 310 of the PC 103 sends an HTTP request for downloading the encrypted job image to the Web server 104.

FIG. 11C illustrates an example of the HTTP request sent in S1005.

A header of the HTTP request includes URL information about the encrypted job image and the access key for the permission of the downloading. Using the URL information and the access key, the communication unit 310 of the PC 103 downloads the encrypted job image. As seen from the above, the PC 103 can search for job log record attributes on the Web server 104 and can obtain an encrypted job image, as the search values remain encrypted.

Next, In S1006, the encryption unit 313 of the PC 103 obtains a private key stored in the storage unit 314 of the PC 103.

Next, in S1007, the encryption unit 313 of the PC 103 uses the private key to decrypt the session key received in S1004.

Next, in S1008, the encryption unit 313 of the PC 103 uses the session key decrypted in S1007 to decrypt the encrypted job log image downloaded in S1005. As seen from the above, only the PC 103 holding the private key can decrypt the job image. Upon displaying the search result screen 408, the display unit 312 of the PC 103 finishes the processing of this flowchart.

Lastly, a flow of processing by the Web server 104 to perform a full-text search on job log records as job log records remain encrypted will be described with reference to FIG. 12.

FIG. 12 is a flowchart illustrating an example of processing performed by the Web server 104 for performing a full-text search on job log records as the job log records remain encrypted. The processing illustrated in this flowchart is implemented by the CPU 211 of the Web server 104 loading a control program stored in the storage 213 of the Web server 104 or the like onto the RAM 212 of the Web server 104 and executing the control program.

Upon receiving a job attribute search request, the Web server 104 starts a process of S1201. In S1201, the communication unit 320 of the Web server 104 receives an HTTP request for requesting a job log record search and reads search values for one of a job attribute search and a job full-text search included in a body of the HTTP request in the JSON format. The HTTP request is one sent from the PC 103 in S1003 in FIG. 10; for example, the HTTP request as illustrated in FIG. 11A. That is, the Web server 104 here receives data that the PC 103 makes by encrypting the search values input by a user using a key corresponding to the common key, as search keys.

Next, in S1202, the communication unit 320 of the Web server 104 determines whether the request is a job full-text search request. More specifically, in a case where the above HTTP request includes a job full-text search values (words), it is determined that the request is a job full-text search request. In a case where the request is a job full-text search request, the communication unit 320 proceeds the processing to S1203. In a case where the request is not a job full-text search request, the communication unit 320 proceeds the processing to S1204.

In S1203, the storage unit 321 of the Web server 104 refers to the full-text search index to obtain a job log record ID of a job image that includes the words specified in the above HTTP request, and proceeds the processing to S1204.

In S1204, for the job attributes specified in the above HTTP request, the storage unit 321 of the Web server 104 obtains a job log record having job attribute values that match the search values, from the database. At that time, in a case where the job log record ID is obtained in S1203, the job attributes and the job log record ID are used in a form of an AND condition to obtain a job log record from the database. Since the search values subjected to the FPE encryption by the PC 103 and the job attributes or the words subjected to the FPE encryption by the MFP 102 are both encrypted using the same common key, the encrypted values are unique to each other, which enables a match search as the value remaining encrypted.

Next, in S1205, the communication unit 320 of the Web server 104 sends an HTTP response for responding with a search result of S1204 (e.g., see FIG. 11B) to the PC 103. As described above, the HTTP response includes a URL used for downloading an encrypted job image, an access key for the permission of the downloading, and a session key. At that time, the Web server 104 temporarily permits the PC 103 to download the encrypted job image while restricting access sources using the access key.

Next, in S1206, the communication unit 320 of the Web server 104 receives an HTTP request for requesting the downloading of the encrypted job image (S1005 in FIG. 10, e.g., see FIG. 11C) from the PC 103. As described above, the HTTP request includes URL information about the encrypted job image and the access key for the permission of the downloading.

In S1207, the communication unit 320 of the Web server 104 responds to the PC 103 with the encrypted job image. As seen from the above, the Web server 104 performs the job attribute search and the job full-text search to obtain the encrypted job image as the search values remain encrypted.

As described above, the present embodiment enables job log records of the MFP 102 to be held in the Web server 104 as the job log records remain encrypted, and enables the job log records to be subjected to a full-text search on the Web server 104 using attributes and a character string in a job log image, as the job log records remain encrypted.

Other Embodiments

In the first embodiment, the Web server 104 is configured to manage job log records, but the Web server 104 may be configured to manage only the full-text search index.

Figure 13:
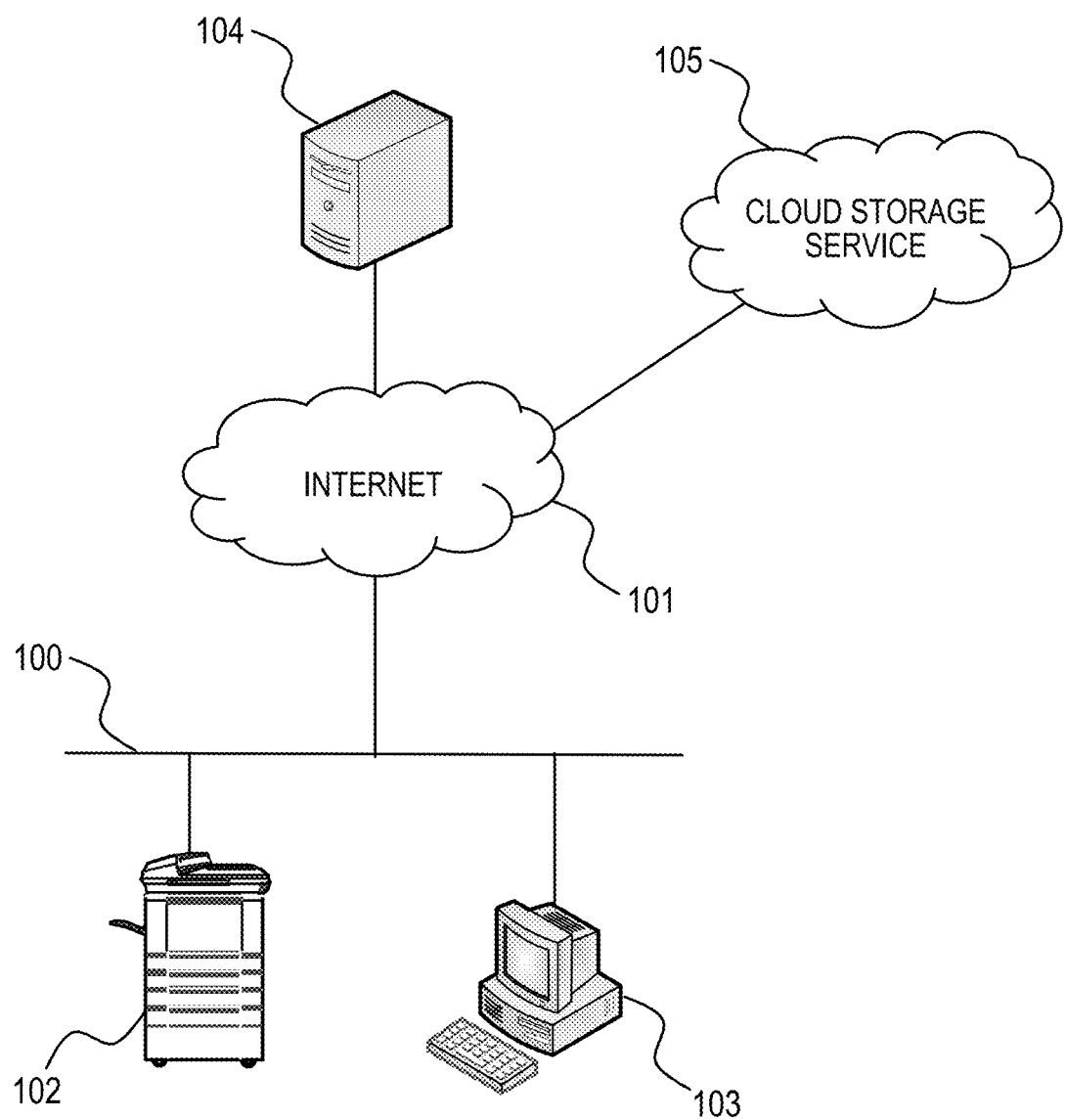
FIG. 13 is a diagram illustrating an example of a configuration of an information processing system that represents another embodiment.
Figure 14:
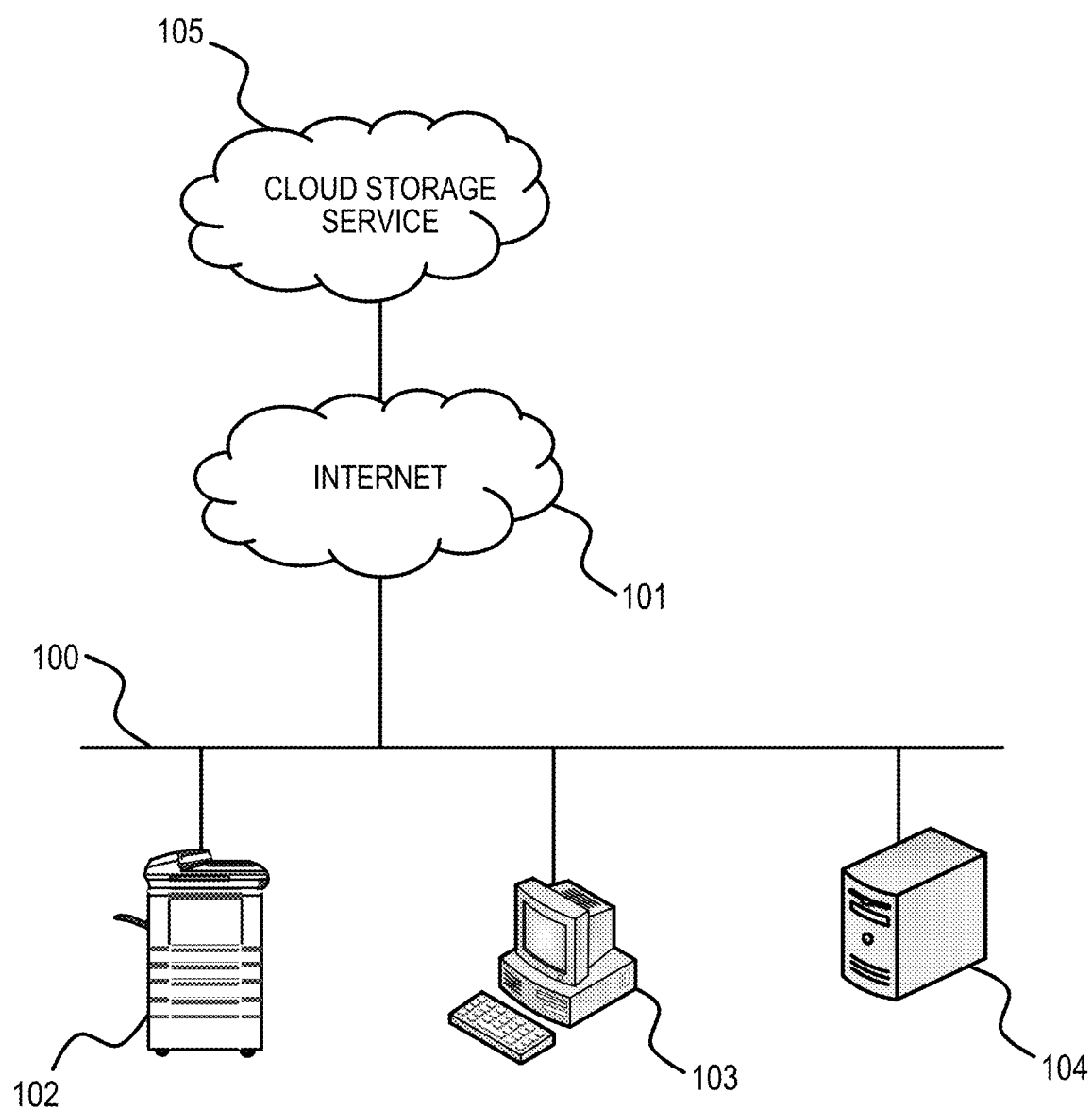
FIG. 14 is a diagram illustrating an example of a configuration of an information processing system that represents still another embodiment.

FIG. 13 and FIG. 14 are diagrams each illustrating an example of a configuration of an information processing system that represents another embodiment of the present invention.

For example, a system illustrated in FIG. 13 has a configuration in which job images and job attributes are retained in a cloud storage service 105 that can manage files and metadata, and a full-text search index is managed by a Web server 104. As the cloud storage service 105, for example, Google® Drive™ and the like are available.

A system illustrated in FIG. 14 has a configuration in which a Web server 104 is disposed not in a cloud but in an intranet 100, and the Web server 104 manages only a full-text search index as with the system configuration illustrated in FIG. 13.

As seen from the above, these embodiments enable a cloud storage service used by a customer to be available as a location for retaining job log records. Moreover, a full-text search can be performed on the job log records some of which can include classified information while the job log records are managed on the cloud storage service safely as the job log records remain encrypted.

As described above, these embodiments cause job log records encrypted by an image processing apparatus to be held in an external server, enables the job log records to be managed on the external server as the job log records remain encrypted, and enables the job log records to be subjected to a full-text search using attributes and a character string in an image to be performed as the job log records remain encrypted. This can therefore establish compatibility between enhanced security brought by encryption and high convenience such as searching using attributes of a job log record and a character string in an image even in a case where job log records of the image processing apparatus are managed on the cloud or the like. As a result, problems about privacy that arise in a case where classified information is saved and managed on the cloud can be solved.

It should be appreciated that the configurations and content of these kinds of data described above do not limit the present invention and can be different configurations and content according to applications or purposes.

The embodiments are described above, but the present invention can include embodiments in the forms of, for example, systems, apparatuses, methods, programs, or storage media. Specifically, the present invention may be applied to a system formed of a plurality of apparatuses and may be applied to equipment formed of a single apparatus.

In addition, configurations made by combining the above embodiments are to be included in the present invention.

In addition, the present invention can be implemented in a form of a process that includes providing a program that implements at least one of the functions of the embodiments described above to a system or an apparatus over a network or via a storage medium and causing at least one processor in a computer of the system or the apparatus read and execute the program. Alternatively, the present invention can be implemented in a form of a circuit that implements at least one of the functions (e.g., ASIC).

The present invention may be applied to a system including a plurality of apparatuses and may be applied to equipment including a single apparatus.

The present invention is not limited to the above-described embodiments, and various modifications (including organic combinations of the embodiments) can be included based on the gist of the present invention and not to be excluded from the scope of the present invention. That is, configurations made by combining the above-described embodiments and their modifications are to be included in the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-127354, filed Jul. 9, 2019, which is hereby incorporated by reference herein in its entirety.

What is claimed is:

1. An image processing apparatus comprising:
an acceptance unit configured to accept a first key and a second key that are used for encryption processing, from an information processing apparatus;
a writing unit configured to write, upon performance of a job, attribute data of the job and image data being a subject of the job as a job log record;
a performance unit configured to perform character recognition processing on the image data included in the job log record;
an extraction unit configured to extract at least one word from a character string that is recognized as a result of the character recognition processing;
a first encryption unit configured to perform encryption processing on the attribute data and the at least one extracted word using the first key;
a second encryption unit configured to perform encryption processing on the image data included in the job log record using the second key;
a sending unit configured to send the attribute data and the at least one extracted word that are encrypted by the encryption processing using the first key to a server over a network; and
an upload unit configured to upload encrypted data that is generated by the encryption processing performed on the image data using the second key to the server over the network, according to an instruction from the server.

2. The image processing apparatus according to claim 1, wherein the first key and the second key are encryption keys different from each other.

3. The image processing apparatus according to claim 1, wherein the encryption processing using the second key includes encrypting the image data using a third key, encrypting the third key using the second key, and generating the encrypted data including the encrypted image data and the encrypted third key.

4. The image processing apparatus according to claim 3, comprising a generation unit configured to generate the third key for each job.

5. The image processing apparatus according to claim 3, wherein the first key corresponds to a first common key in a first common-key cryptosystem,
the second key corresponds to a public key of a key pair including the public key and a private key in a public-key cryptosystem, and
the third key corresponds to an another common key in an another common-key cryptosystem.

6. The image processing apparatus according to claim 1, wherein the sending unit sends the at least one extracted word encrypted by the encryption processing using the first key to another server over the network.

7. A system comprising an image processing apparatus and a server,
wherein the image processing apparatus comprises:
an acceptance unit configured to accept a first key and a second key that are used for encryption processing, from an information processing apparatus;
a writing unit configured to write, upon performance of a job, attribute data of the job and image data being a subject of the job as a job log record;
a performance unit configured to perform character recognition processing on the image data included in the job log record;
an extraction unit configured to extract at least one word from a character string that is recognized as a result of the character recognition processing;
a first encryption unit configured to perform encryption processing on the attribute data and the at least one extracted word using the first key;
a second encryption unit configured to perform encryption processing on the image data included in the job log record using the second key;
a sending unit configured to send the attribute data and the at least one extracted word that are encrypted by the encryption processing using the first key to the server over a network; and
an upload unit configured to upload encrypted data that is generated by the encryption processing performed on the image data using the second key to the server over the network, according to an instruction from the server, and
wherein the server includes:
a management unit configured to manage the attribute data and the at least one extracted word that are encrypted by the encryption processing using the first key after associating the attribute data and the at least one extracted word with location information indicating a storage location to which the encrypted data is to be uploaded;
a reception unit configured to receive data that the information processing apparatus makes by encrypting information input by a user using a key corresponding to the first key, as a search key;
a search unit configured to search at least one of the encrypted attribute data and the encrypted at least one extracted word that are managed by the management unit for data that matches the search key; and
a provision unit configured to provide the information processing apparatus with the location information that is associated with the data matched as a result of the search and is managed by the management unit.

8. A control method for an image processing apparatus, the control method comprising:
accepting a first key and a second key that are used for encryption processing, from an information processing apparatus;
writing, upon performance of a job, attribute data of the job and image data being a subject of the job to a writing unit as a job log record;
performing character recognition processing on the image data included in the job log record;
extracting at least one word from a character string that is recognized as a result of the character recognition processing;
performing first encryption that performs encryption processing on the attribute data and the at least one extracted word using the first key;

performing second encryption that performs encryption processing on the image data included in the job log record using the second key;

sending the attribute data and the at least one extracted word that are encrypted by the encryption processing using the first key to a server over a network; and uploading encrypted data that is generated by the encryption processing performed on the image data using the second key to the server over the network, according to an instruction from the server.

* * * * *